Oct. 14, 1958  K. W. ENGLAND  2,856,042
COMBINATION BRAKE AND THROTTLE ACTUATOR FOR VEHICLES
Filed Nov. 8, 1954   2 Sheets-Sheet 1
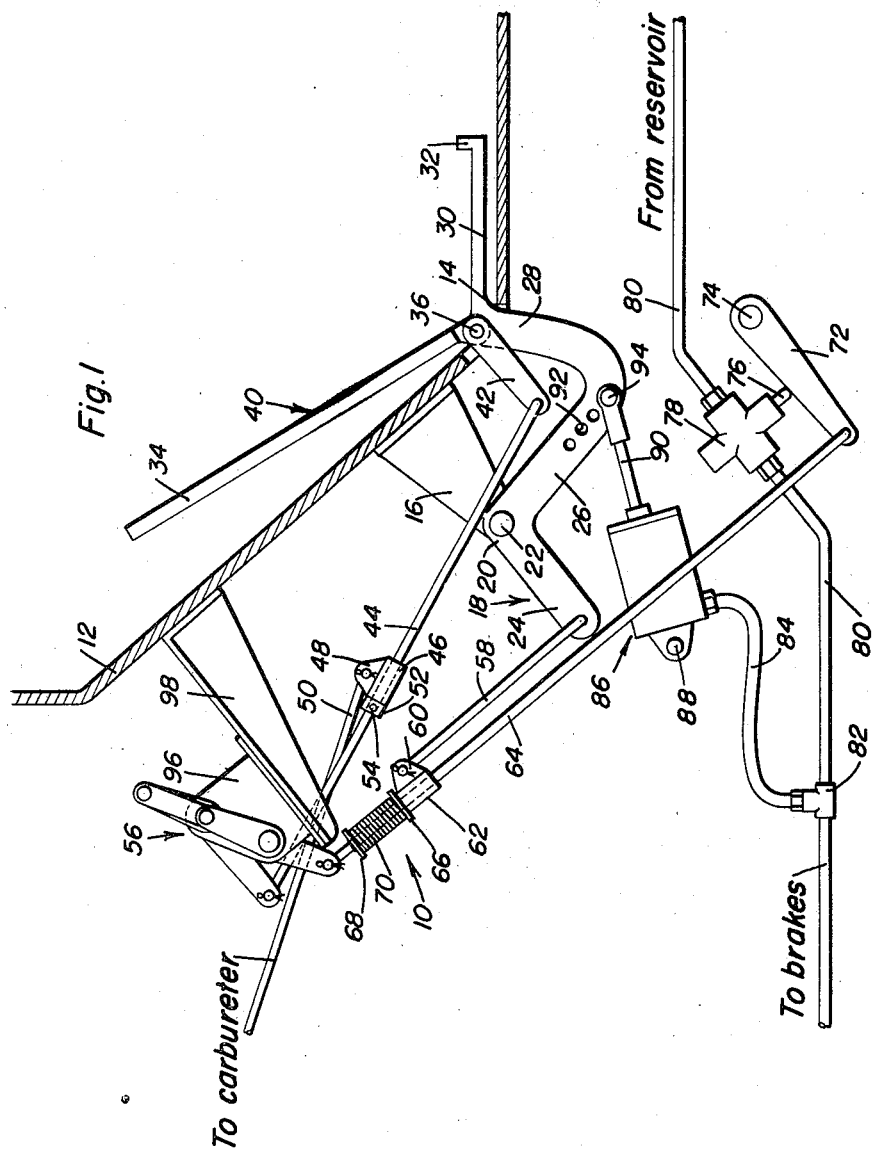
Kenneth W. England
INVENTOR.

Oct. 14, 1958  K. W. ENGLAND  2,856,042
COMBINATION BRAKE AND THROTTLE ACTUATOR FOR VEHICLES
Filed Nov. 8, 1954  2 Sheets-Sheet 2
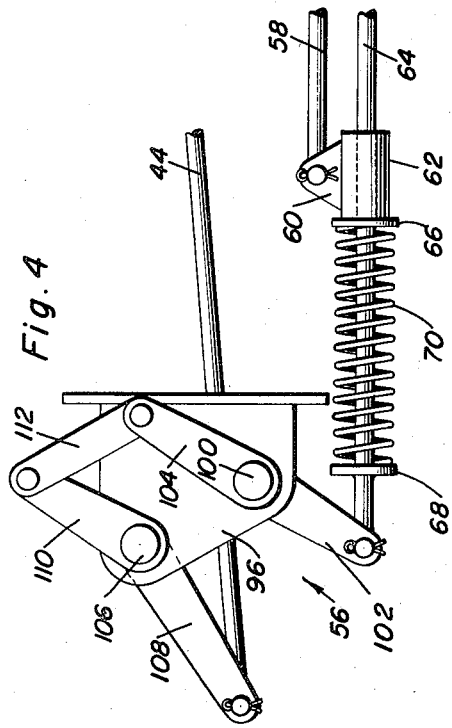
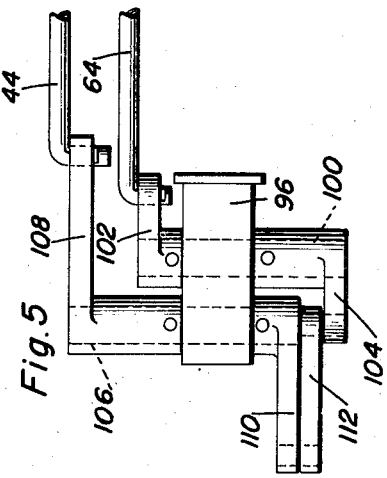
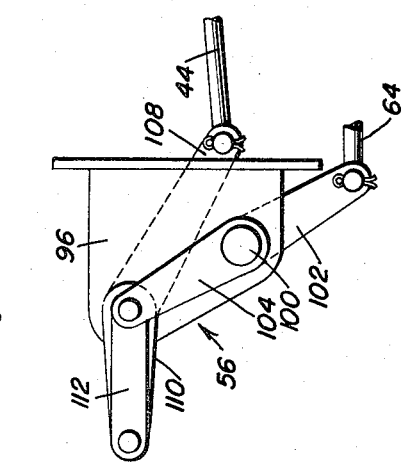
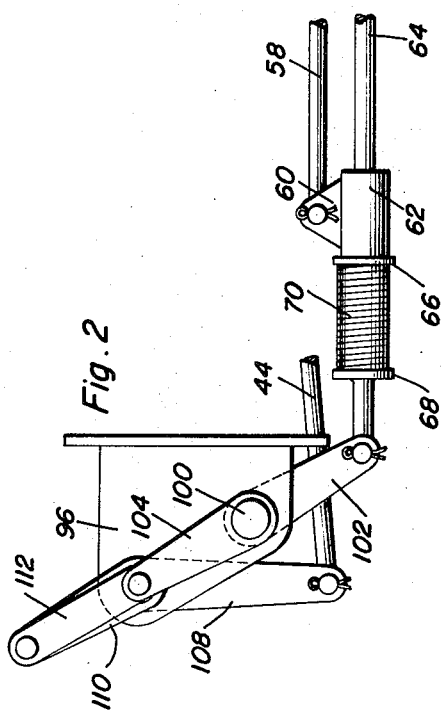
Kenneth W. England
INVENTOR.
BY *Clarence A. O'Brien*
*and Harvey B. Jacobson*
Attorneys

United States Patent Office 2,856,042
Patented Oct. 14, 1958

2,856,042

COMBINATION BRAKE AND THROTTLE ACTUATOR FOR VEHICLES

Kenneth W. England, Campbellton, Tex.

Application November 8, 1954, Serial No. 467,385

8 Claims. (Cl. 192—3)

This invention generally relates to new and useful improvements in brake and throttle actuators for vehicles, and the primary object of the present invention is to provide an improved construction with resultant improved operation over my copending application, Serial No. 294,122, filed June 18, 1952, now Patent No. 2,738,862, granted March 20, 1956.

Another object of the present invention is to provide a combination brake and throttle actuator for vehicles including a pivotal pedal and an extension pedal portion that is operatively connected to a brake actuator and a throttle actuator, whereby the vehicle will be accelerated by depressing the pedal in the usual manner, and the brake actuator will be operated after the throttle actuator is moved to idling position when the pedal portion is pivoted downwardly to a brake applying position.

A further object of the present invention is to provide a combined brake and throttle actuator for vehicles which includes in its construction an energizing device responsive to the normal weight of a person's foot on a portion of the gas pedal wherein the energizer will actuate the brake actuator when the throttle actuator is moved to a position that closes the throttle.

Still another important object of the present invention is to provide a combination brake and throttle actuator for vehicles conformable to the preceding objects that also includes a reacting device that will urge the pedal portion upwardly when the brakes are applied, thereby giving movement to the pedal portions responsive to the degree of brake application, thereby giving the pedal portion "feel."

Another important object of the present invention is to provide a combination braking and throttling device for vehicles that is simple and practical in construction, easily and quickly attached on a vehicle to replace the conventional accelerator pedal and brake pedal, strong and reliable in use, small and compact in structure, efficient and durable in operation, inexpensive to manufacture, safe, easy to install and service, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view of a vehicle floor board showing the present invention mounted thereon and connected to the usual components of a vehicle;

Figure 2 is a detail view showing the linkage mechanism or system for locking the brake actuator when the throttle actuator is moving towards a neutral position with the spring energizer compressed;

Figure 3 is a detailed elevational view similar to Figure 2 showing the position of the linkage system when the throttle actuator is in the throttle opening or accelerating position;

Figure 4 is a side elevational view similar to Figures 2 and 3 showing the linkage system with the throttle actuator moved to a braking position with the throttle closed to an idling position wherein the linkage system is unlocked for permitting an energizing mechanism to actuate the brake actuator; and Figure 5 is a top view of Figure 3, showing the support for the linkage mechanism and the particular construction thereof.

Referring now specifically to the drawings, it will be seen that the numeral 10 generally designates the combination brake and throttle actuator of the present invention for attachment to the floor board 12 of a vehicle wherein the floor board 12 is provided with an opening 14 therein for a purpose described hereinafter.

Secured to the undersurface of the floor board 12 and projecting therefrom is a mounting bracket 16 pivotally supporting a bellcrank 18 at its apex 20 by pivot pin 22. The bellcrank 18 is provided with two right angularly extending arms 24 and 26 wherein the arm 26 is provided with an extension 28 projecting through the aperture 14 in the floor board 12 wherein the extension 28 terminates in a rigid pedal portion 30 having an upturned flange 32 on the rear end thereof. Pivotally secured to the extension 28 at its junction with the pedal portion 30 is a pivotal pedal 34 connected to the extension 28 by pivot pin 36. For convenience in description of the invention, the pedal 34 will be described as the throttle pedal, and the pedal portion 30 will be described as the brake actuating pedal portion, wherein the assembly is generally designated by the numeral 40 and is substituted for the conventional accelerator and brake pedals normally found in vehicles. Secured to and movable with the pedal 34 of the assembly 40 is an arm 42 projecting through the aperture 14 in the floor board 12 which is connected to one end of a throttle actuator 44 which is in the nature of an elongated rod. Slidably positioned on the throttle actuator 44 is a tubular sleeve 46 having an ear 48 thereon for pivotally receiving one end of a throttle rod 50. A collar 52 is adjustably secured to the throttle actuator 44 by a setscrew 54 thereby varying the limit of the sliding movement of the sleeve 46 on the throttle actuator 44. The throttle rod 50 is connected to the usual throttle linkage on the carburetor of a vehicle for opening and closing the throttle for controlling the speed of the vehicle. When the pedal 34 of the assembly 40 is depressed, the arm 42 will move the throttle actuator 44 rearwardly wherein the collar 52 will engage the sleeve 46 and move the sleeve 46 together with the integral ear 48 and the throttle rod 50 rearwardly with the throttle actuator 44 thereby opening the throttle on the carburetor, wherein the speed of the vehicle will increase. When the pedal 34 is permitted to pivot upwardly, the throttle actuator 44 moves forwardly and the sleeve 46 slides thereon, thereby permitting the throttle rod 50 to return to its normal position with the throttle closed in the carburetor by the usual return springs in the carburetor mechanism (not shown). It will be understood that this specific construction permits movement of the throttle actuator 54 in one direction without affecting the throttle directly, but when moved in the other direction, will mechanically open the throttle on the carburetor.

The end of the throttle actuator 44 remote from the arm 42 is pivotally connected to a linkage mechanism or system generally designated by the numeral 56 to be described hereinafter.

The end of the arm 24 of the bellcrank 18 is pivotally connected to a rod 58 that is attached at its other end to an integral ear 60 on a sliding sleeve 62. The sliding sleeve 62 is mounted on brake actuator 64 which is in the nature of an elongated rod. The sleeve 62 is provided with a collar 66 on one end thereof and rigidly secured to the brake actuator 64 in spaced relation to the collar 66 is a collar 68 in facing relation to the collar 66 and a compression coil spring 70 is positioned between the collars 66 on the sleeve 62 and collar 68 on the brake actuator 64. One end of the brake actuator 64 is pivotally connected to the linkage mechanism 56 in a manner described hereinafter. The other end of the brake actuator 64 is pivotally connected to a arm 72 rotatably mounted on a shaft 74. The arm 72 is in engagement with a valve plunger 76 mounted in a valve housing 78 that is disposed in an air supply line 80 which runs from the reservoir to the brakes. It will be understood that the specific details of the reservoir as well as the specific details of the brake and brake mechanism do not constitute a part of the present invention as the present invention may be utilized with all types of brakes. Further, while the plunger type valve construction is illustrated together with the actuating arm 72, it will be understood that any type of control valve may be utilized for admitting the air pressure from the reservoir to the brakes for actuation of the brakes when the brake actuator 64 is moved. Positioned in the supply line 80 between the valve housing 78 and the brakes is a T-connection 82 having a flexible line 84 extending therefrom. The flexible line 84 is in communication with the interior of a piston and cylinder arrangement generally indicated by the numeral 86 that is pivotally supported on pivot pins 88 and includes a piston rod 90 extending therefrom and connected to a selected aperture 92 in the arm 26 of bellcrank 18 by a pivot pin 94 wherein the piston rod 90 may be attached to the bellcrank 18 at any one of the selected apertures 92. It will be understood that when the brake actuator 64 is moved to a brake applying position, the air pressure will be admitted through the valve 78 and into the supply line 80 wherein the flexible line 84 will communicate with the interior of the piston and cylinder arrangement 86 thereby forcing the piston rod 90 outwardly and urging the bellcrank 18 about its pivot point 22, thereby raising the rear portion of pedal portion 30 of the assembly 40 so that the person's foot operating the vehicle will feel this movement and realize that the brakes are being applied, wherein the person will have a natural "feel" of applying the brakes. Further, the movement of the piston rod 90 will be responsive to the degree or severity of the brake application as the harder the brakes are applied, the more pressure that is admitted to the line 80 on the discharge side of the valve 78, thereby causing a quicker and larger movement of the piston rod 90. By varying the attachment of the rod 90 to the bellcrank 18, the characteristics of the "feel" may be changed as desired for each individual driver.

Referring now specifically to Figures 2-5, the linkage mechanism or system 56 is specifically illustrated, and it is this mechanism which interconnects the throttle actuator 44 and the brake actuator 64 which permits the invention to operate in the desired manner and forms the heart thereof. The linkage system generally is mounted on a support designated by the numeral 96 that is supported on a bracket 98 secured to the undersurface of the floor board 12.

The linkage system 56 includes an elongated pivot pin 100 journaled in the support 96 and having a first arm 102 rigidly attached to one end thereof, and a second arm 104 rigidly secured to the other end thereof, thereby forming an elongated lever which is pivoted at its center by the pivot pin 100. The free end of the first arm 102 is pivotally secured to the end of the brake actuator 64 closely adjacent the spring 70. Journaled in the support 96 is a transverse shaft 106 projecting to each side of the support 96 and including a first link 108 rigidly secured to one end of the shaft 106 and a second link 110 rigidly secured to the other end of the shaft 106 wherein the second link 110 and the second arm 104 are disposed to the same side of the support 96. Pivotally interconnecting the free ends of the second link 110 and the second arm 104 is a connecting link 112. The free end of the first link 108 is pivotally connected to the throttle actuator 44. The length of the connecting link 112 is equal to the length of the second link 110 wherein the pivotal connection between the connecting link 112 and the second arm 104 coincides with the longitudinal axis of the pivot shaft 106 when link 112 is in alignment with the second link 110. In order for the arms 102 and 104 which form in effect a rigid lever pivoted at its center about pivot pin 100 to move about the pivot pin 100, it is necessary that the pivotal connection between the connecting link 112 and the second arm 104 move in an arcuate manner about a center defined by the pivot pin 100. If the connecting link 112 and the second link 110 are positioned in overlying relation so that the pivotal connection between the connecting link 112 and the second arm 104 is coincidental with the axis of the shaft 106, then, it will be impossible for the pivotal connection between the connecting link 112 and the second arm 104 to move, thereby preventing pivotal movement of the first arm 102 about the pivot pin 100, thereby locking the brake actuator 64. When the throttle actuator 44 is in its outermost position with the pedal 34 depressed, it will be noted that the first link 108 is positioned in the manner as illustrated in Figure 3, wherein the second link 110 and the connecting link 112 are positioned in overlying parallel relation and the lever formed by the first arm 102 and the second arm 104 cannot pivot about pivot pin 100 as the end of the second arm 104 is held stationary because of the rigidity of the connecting link 112 which is connected to the second link 110. As long as the throttle actuating rod 44 is in the position illustrated in Figure 2 or in any position between Figure 2 and Figure 3, it will be impossible for the brake actuator 64 to move forwardly for actuating the valve plunger 76. This condition exists when the throttle actuator 44 is in the position as illustrated in Figure 3, which is an accelerating condition, and also in the condition as illustrated in Figure 2 which is a decelerating condition through which throttle actuator 44 must pass wherein the second arm 104 as well as the first arm 102 is prevented from pivoting due to the rigidity of connecting link 112 which forms a straight line with the arms 102 and 104, thereby preventing pivotal movement of the lever formed by the arms 102 and 104 until the throttle actuator 44 is moved towards a closed position more than the position shown in Figure 2. As the driver of the vehicle rests his foot on the pedal portion 30 of the assembly 40, the rod 58 slides the sleeve 62 upwardly, thereby compressing spring 70 and when the pedal 34 is pivoted upwardly in decelerating, the throttle actuator 44 moves forwardly, thereby carrying the second link 108 towards the position as illustrated in Figure 4. This moves the end of the link 112 downwardly in an arcuate manner, thereby permitting the arms 102 and 104 to pivot about pivot pin 100 as soon as the pivotal connection between link 112 and arm 104 crosses over the axis of pin 106 thereby permitting the spring 70 to expand for moving the brake actuator 64, thereby actuating the valve mechanism 78 which applies the brakes.

While the device of the present invention is illustrated in use with an air brake system, it will be understood that any type of control means may be utilized for actuating any brake actuation means on any type of brake system, when the brake actuator 64 is moved. Further, the device may be mounted on any suitable support such as the frame or other rigid support means normally found in vehicles utilizing air, hydraulic, electric, vacuum or other braking systems. Also, the device of the present invention materially adds to the comfort of the driver due to the lowering of the pedal portion when the weight of the driver's foot is placed thereon for permitting the foot to asume a natural position.

In operation of the device of the present invention, the pedal 34, which is generally similar to a conventional accelerator pedal, is disposed substantially in the manner illustrated in Figure 1 and the entire device is in an idling position which is caused by the various return springs associated with the construction which is the same action as the return springs of the accelerator pedal and the brake pedal of conventional automotive vehicle. As the automobile is started, the person operating the same will normally depress the pedal 34 and rest the heel portion of his foot on the pedal portion 30 of the bellcrank 18. Depression of the pedal 34 will move the throttle to an open position for accelerating or maintaining a desired speed wherein operation of the vehicle will be the same as the normal operation of a conventional vehicle. When it is desired to apply the brakes for any purpose whatsoever whether it be for an emergency stop or for any conventional brake application, the gas pedal 34 is released by moving the foot upwardly wherein the return springs will move the accelerator pedal 34 and its associated linkage to an idling position wherein the locking mechanism will move from the position illustrated in Figure 3 to a position illustrated in Figure 4. Inasmuch as the heel has been resting on the pedal portion 30, the spring 70 has become depressed wherein the rigidly interconnected links 102 and 104 will swing about the axis 100 as soon as the rigid links 108 and 110 swing about the axis 106 sufficiently to permit arcuate swinging movement of the connection between the links 104 and 112. The forward movement of the brake actuator 64 will apply the brakes in the manner previously described and the scope of pressure on the pedal portion 30 will of course determine the force of application of the brake. It is pointed out in operation of a conventional vehicle having a brake and accelerator pedal, the operator of the vehicle normally releases the accelerator pedal and moves his foot to the brake pedal for operation thereof. In this instance, it will be readily apparent that the accelerator pedal 34 as well as the accelerator pedal of the conventional vehicle must be released prior to application of the brakes. In some instances, conventional automotive vehicles are provided with automatic transmissions wherein the right foot may be employed for operating the accelerator pedal and the left foot employed for applying the brakes. However, even in this particular case, the accelerator pedal of this type of vehicle is normally released prior to application of the brakes and as a general rule, the brake and accelerators are not depressed at the same time. Therefore, the operation of the device wherein the brake is not actuatable during acceleration or depression of the pedal 34 is not unsafe since it follows the accepted procedure of operating a vehicle.

From the foregoing, the construction and operation of the device will be readily understood and further explanation is believed to be unnecesary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake actuator energized by pressure on the pedal portion of the bellcrank for moving said brake actuator when the forward end of said pedal is pivoted upwardly to a throttle closing position.

2. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake actuator energized by pressure on the pedal portion of the bellcrank for moving said brake actuator when the forward end of said pedal is pivoted upwardly to a throttle closing position, said energizer including a compression spring mounted on said brake actuator and engaging one end of said sleeve, a stationary collar on said brake actuator for engaging said spring wherein depression of the pedal portion will compress said spring when the brake actuator is locked, said spring moving said brake actuator to a brake applying position when the forward end of the pedal is pivoted upwardly thereby moving the linkage system and unlocking the brake actuator.

3. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake actuator energized by pressure on the pedal portion of the bellcrank for moving said brake actuator when the forward end of said pedal is pivoted upwardly to a throttle closing position, and a reacting device interconnecting the brake applying mechanism and the bellcrank for urging the rear end of said pedal upwardly when the brake applying mechanism is actuated thereby imparting motion to the rear end of said pedal portion when the brakes are applied, said reacting device varying the movement of said rear end of the pedal portion in accordance with the degree of brake application.

4. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake actuator energized by pressure on the pedal portion of the bellcrank for moving said brake actuator when the forward end of said pedal is pivoted upwardly to a throttle closing position, and a sleeve slidably mounted on said throttle actuator, a collar on said throttle actuator for limiting the sliding movement of said sleeve, a throttle rod connected to said sleeve for opening a throttle when the actuator is moved in one direction and leaving the throttle closed when the throttle actuator is moved in the opposite direction.

5. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake acuator energized by pressure on the pedal portion of the bellcrank for moving said brake actuator when the forward end of said pedal is pivoted upwardly to a throttle closing position, said linkage system including a support, a lever pivotally mounted at its center to said support, said brake actuator being attached to one end of said lever, a shaft journaled on said support in spaced relation to the pivotal connection between said lever and support, a pair of links rigidly connected to said shaft, one of said links being pivotally connected to said throttle actuator, and a connecting link interconnecting the end of the other of said links to the other end of said lever, said pivotal connection between said connecting link and said lever coinciding with the axis of said shaft when the throttle actuator is in a throttle opening position and during movement towards a throttle closing position thereby positioning the connecting link in parallel relation to the other of said pair of links thereby preventing arcuate movement of the pivotal connection between the lever and said connecting link for precluding pivotal movement of said lever and locking said brake actuator.

6. A combined brake and throttle actuator comprising a mounting bracket, a bellcrank pivoted at its apex to the bracket and having an extending pedal portion, a pedal having forward and rear ends with the rear end pivotally attached to one end of the bellcrank adjacent the pedal portion, the forward end of said pedal being depressible to a throttle opening position and being pivotable upwardly to an idling position, said pedal portion being depressible to a brake applying position and pivotable upwardly to brake releasing position, a throttle actuator connected to said pedal for opening the throttle when the forward end of the pedal is depressed, a rod connected to the other end of said bellcrank, a brake actuator extending in substantially parallel spaced relation to said rod, a sleeve slidably mounted on said brake actuator, said rod connected to said sleeve for movement thereof on said brake actuator, a linkage system interconnecting said brake actuator and throttle actuator for locking the brake actuator when the throttle actuator is in a throttle opening position, and energizing means on said brake actuator energized by pressure on the pedal portion of the bellcrank for moving said brake actuator when the forward end of said pedal is pivoted upwardly to a throttle closing position, said linkage system including a support, a lever pivotally mounted at its center to said support, said brake actuator being attached to one end of said lever, a shaft journaled on said support in spaced relation to the pivotal connection between said lever and support, a pair of links rigidly connected to said shaft, one of said links being pivotally connected to said throttle actuator, and a connecting link interconnecting the end of the other of said links to the other end of said lever, said pivotal connection between said connecting link and said lever coinciding with the axis of said shaft when the throttle actuator is in a throttle opening position and during movement towards a throttle closing position thereby positioning the connecting link in parallel relation to the other of said pair of links thereby preventing arcuate movement of the pivotal connection between the lever and said connecting link for precluding pivotal movement of said lever and locking said brake actuator, said pivotal connection between the outer end of the other of said pairs of links and the connecting link swinging downwardly about the axis of said shaft when the throttling actuator is moved to a throttle closing position with the forward end of said pedal pivoted upwardly thereby permitting arcuate movement of the pivotal connection between the lever and the connecting link thereby permitting pivotal movement of said lever and brake actuator, said brake actuator being moved by said energizing means.

7. A combined brake and throttle actuator for vehicles comprising a mounting bracket, a bellcrank pivotally attached at its apex to said bracket and having an integral pedal portion, a pedal pivotally attached to said bellcrank, a throttle actuator connected to said pedal, a brake actuator connected to said bellcrank, and a linkage mechanism interconnecting said throttle actuator and brake actuator for locking said brake actuator when the throttle actuator is in a throttle opening position and permitting movement of said brake actuator when the throttle actuator is in a throttle closing position with the pedal pivoted upwardly.

8. A combined brake and throttle actuator for vehicles comprising a mounting bracket, a bellcrank pivotally attached at its apex to said bracket and having an integral pedal portion, a pedal pivotally attached to said bellcrank, a throttle actuator connected to said pedal, a brake actuator connected to said bellcrank, and a linkage mechanism interconnecting said throttle actuator and brake actuator for locking said brake actuator when the throttle actuator is in a throttle opening position and permitting movement of said brake actuator when the throttle actuator is in a throttle closing position with the pedal pivoted upwardly, said brake actuator having an energizer for moving said brake actuator to a brake applying position when said brake actuator is unlocked.

References Cited in the file of this patent

UNITED STATES PATENTS

| | | |
|---|---|---|
| 1,711,712 | Yost | May 7, 1929 |
| 2,338,244 | Hayes | Jan. 4, 1944 |
| 2,596,998 | Van Hilson | May 20, 1952 |
| 2,738,862 | England | Mar. 20, 1956 |